United States Patent
Thompson et al.

(10) Patent No.: US 11,273,334 B2
(45) Date of Patent: Mar. 15, 2022

(54) RESPIRATOR MASK WITH VOICE TRANSMITTAL FEATURE

(71) Applicant: Scott Technologies, Inc., Monroe, NC (US)

(72) Inventors: Darin Kyle Thompson, Huntersville, NC (US); Amy Elizabeth Quiring, Matthews, NC (US); Edward Powers Simmonds, Indian Trail, NC (US); Graham Peter Wilson, Flint (GB); Carl Estcourt Tucker, Old Colwyn (GB)

(73) Assignee: Scott Technologies, Inc., Monroe, NC (US)

( * ) Notice: Subject to any disclaimer, the term of this patent is extended or adjusted under 35 U.S.C. 154(b) by 291 days.

(21) Appl. No.: 15/769,846

(22) PCT Filed: Oct. 20, 2016

(86) PCT No.: PCT/US2016/057921
§ 371 (c)(1),
(2) Date: Apr. 20, 2018

(87) PCT Pub. No.: WO2017/070352
PCT Pub. Date: Apr. 27, 2017

(65) Prior Publication Data
US 2018/0311516 A1    Nov. 1, 2018

Related U.S. Application Data (60) Provisional application No. 62/244,917, filed on Oct. 22, 2015.

(51) Int. Cl.
*A62B 18/08*    (2006.01)
*H04R 1/08*    (2006.01)
(Continued)

(52) U.S. Cl.
CPC ............ *A62B 18/08* (2013.01); *A62B 23/025* (2013.01); *F16J 3/02* (2013.01); *H04R 1/08* (2013.01);
(Continued)

(58) Field of Classification Search
CPC .................. A62B 18/08; A62B 23/025; A62B 18/02-025; F16J 3/00-02; H04R 1/02; H04R 1/028; H04R 1/08; H04R 2201/023
(Continued)

(56) References Cited

U.S. PATENT DOCUMENTS 1,762,695 A  *  6/1930  Monro .................... A62B 18/08
                                                        128/201.15
2,164,330 A  *  7/1939  Katz ...................... A62B 18/02
                                                        128/201.19
(Continued)

FOREIGN PATENT DOCUMENTS

CN        2667838 Y      12/2004
CN       204293714 U      2/2015
(Continued)

OTHER PUBLICATIONS

International Search Report for PCT International Application No. PCT/US2016/057921, dated Mar. 17, 2017, 4 pages.
(Continued)

*Primary Examiner* — Elliot S Ruddie (57) ABSTRACT

A respiratory mask includes a body having an interior space that defines a plenum between the body and a face of the user when the user is wearing the mask. The respiratory mask also includes a voice transmittal feature in and contiguous with the body that has a voice transmittal membrane that is configured to vibrate in response to sound waves generated by the user such that the voice transmittal membrane transmits the sound waves from the plenum of the body to an
(Continued)

ambient environment of the user. The voice transmittal feature thus enhances the intelligibility of a user's speech so that others may more clearly understand what the user is saying. For example, this may increase safety and efficiency in emergency response situations in which the use of a respiratory mask is required.

14 Claims, 5 Drawing Sheets (51) Int. Cl.
- *F16J 3/02* (2006.01)
- *A62B 23/02* (2006.01)
- *H04R 1/02* (2006.01)
- *A62B 18/02* (2006.01)

(52) U.S. Cl.
CPC .......... *A62B 18/025* (2013.01); *H04R 1/028* (2013.01); *H04R 2201/023* (2013.01)

(58) Field of Classification Search
USPC .................................................. 128/201.19
See application file for complete search history.

(56) References Cited

U.S. PATENT DOCUMENTS

| | | | |
|---|---|---|---|
| 2,738,788 A * | 3/1956 | Matheson | A62B 18/08 128/201.19 |
| 3,124,130 A * | 3/1964 | Klinger | A62B 18/08 128/201.19 |
| 3,602,219 A | 8/1971 | Warncke | |
| 4,539,983 A | 9/1985 | Angell | |
| 4,718,415 A | 1/1988 | Bolnberger | |
| 5,385,141 A | 1/1995 | Granatiero | |
| 5,895,537 A | 4/1999 | Cambell | |
| 8,820,326 B2 | 9/2014 | Flannigan | |
| 2015/0128936 A1 | 5/2015 | Flannigan | |
| 2016/0001109 A1 * | 1/2016 | Kanno | G10K 13/00 181/167 |

FOREIGN PATENT DOCUMENTS

| | | |
|---|---|---|
| GB | 2264648 | 1/1996 |
| JP | JU60-153145 A | 8/1985 |
| JP | JU61-048747 A | 3/1986 |
| JP | 2000-176033 | 6/2000 |
| JP | 2000-189529 A2 | 7/2000 |
| JP | 3234196 | 12/2001 |

OTHER PUBLICATIONS

Japanese Office Action and English Summary thereof issued in corresponding Japanese Application No. P2018-520473 dated Aug. 11, 2020, consisting of 11 pages.

* cited by examiner

RESPIRATOR MASK WITH VOICE TRANSMITTAL FEATURE

Cross Reference to Related Applications

This application is a national stage filing under 35 U.S.C. 371 of PCT/US2016/057921, filed Oct. 20, 2016, which claims the benefit of US Provisional Patent Application No.62/244917, filed Oct. 22, 2015, the disclosures of which are incorporated by reference in their entirety herein.

TECHNICAL FIELD

The subject matter described and/or illustrated herein relates generally to respirator masks for respiratory protection.

BACKGROUND

Respirator masks are used in environments where individuals are exposed to hazardous materials, such as gases, vapors, aerosols (such as dusts, mists, and/or biological agents), and/or the like. Respirator masks come in a large variety of types and sizes, ranging from cheaper, disposable masks to higher cost, reusable masks that include replaceable filtration cartridges. Some respirator masks, such as half mask respirators, cover the mouth and nose of the user but do not cover the user's eyes, while other respirator masks, such as full face mask respirators, cover the user's eyes in addition to the user's mouth and nose.

Known respirator masks tend to render the speech of the wearer unintelligible, thereby making communication between users difficult. For example, because the respirator mask covers the user's mouth, the body of the respirator mask obstructs the free travel of sound waves from the user's mouth and thereby impairs speech intelligibility. Such speech intelligibility may occur when a user wearing the respirator mask speaks to another person who is not wearing a mask, and/or may occur when two users wearing respirator masks speak with each other. In some circumstances, a user may choose not to wear a respirator mask because of speech intelligibility, which may result in injury to the user's respiratory system.

SUMMARY

The invention advantageously provides a respirator mask that includes a passive voice transmittal feature. The respirator mask provides respiratory protection while also allowing for the transmission of intelligible speech from a user. In one embodiment, the respiratory mask includes a body defining an interior space of the mask and including a first surface and a second surface opposite the first surface, the first surface defining the interior space, and a passive voice transmittal feature contiguous with the body.

In one aspect of the embodiment, the passive voice transmittal feature is a membrane, the membrane having a first surface, a second surface, and a first thickness extending between the membrane first surface and the membrane second surface, the body having a second thickness at at least one location proximate the membrane, the second thickness extending between the body first surface and the body second surface, the first thickness being less than the second thickness.

In one aspect of the embodiment, the membrane first surface is contiguous with the body first surface and the membrane second surface is contiguous with the body second surface.

In one aspect of the embodiment, the membrane has a perimeter, the body further including at least one portion that is adjacent at least a portion of the membrane perimeter, the at least one portion of the body having the second thickness.

In one aspect of the embodiment, the passive voice transmittal feature is integrally formed with a single, unitary construction with the body.

In one aspect of the embodiment, the body further includes an upper segment and a lower segment, the lower segment including the passive voice transmittal feature. In one aspect of the embodiment, the upper segment is configured to receive a nose of a user and the lower segment is configured to receive a mouth of the user. In another aspect of the embodiment, the upper segment is configured to receive a nose of a user and the lower segment is configured to receive a mouth of the user.

In one aspect of the embodiment, the passive voice transmittal feature is located proximate a user's mouth when the user is wearing the mask.

In one aspect of the embodiment, the voice transmittal membrane is and the body are composed of substantially the same material.

In one aspect of the embodiment, the passive voice transmittal feature includes a membrane and a frame coupled to the membrane, the frame being coupled to the body.

In one aspect of the embodiment, frame is removably coupled to the body. In one aspect of the embodiment, the body further includes an opening extending between the body first surface and the body second surface, the opening being configured to receive and retain the frame. In another aspect of the embodiment, wherein the frame is fixedly coupled to the body.

In one aspect of the embodiment, the membrane has a perimeter, the frame being coupled to the perimeter of the membrane.

In one aspect of the embodiment, the passive voice transmittal feature includes a membrane and a frame that is integrally formed with a single, unitary construction with the body, the frame being coupled to the membrane perimeter.

In one embodiment, a respirator mask includes: a body defining an interior space of the mask and including an interior surface, an exterior surface opposite the interior surface, and a first thickness extending from the body interior surface to the body exterior surface, the interior surface defining the interior space; and a passive voice transmittal feature in the body that is contiguous with the body, the passive voice transmittal feature being located proximate a user's mouth when the user is wearing the mask, the passive voice transmittal feature including: a membrane having a perimeter, an interior surface, an exterior surface, and a second thickness extending from the membrane interior surface to the membrane exterior surface, the first thickness being greater than the second thickness; and a frame bordering and being coupled to the membrane perimeter, the frame being coupled to the body.

In one aspect of the embodiment, the frame is removably coupled to the body, the body further including an opening extending between the body interior surface and the body exterior surface, the opening being configured to receive and retain the frame.

In one embodiment, a respirator mask includes a body defining an interior space of the mask and including an interior surface, an exterior surface opposite the interior surface, and a first thickness extending from the body interior surface to the body exterior surface, the interior surface defining the interior space; and a passive voice transmittal feature contiguous with the body and including: a membrane having a perimeter, an interior surface, an exterior surface, and a second thickness extending from the membrane interior surface to the membrane exterior surface, the first thickness being greater than the second thickness; and a frame bordering and being coupled to the membrane perimeter, the frame being formed with a single, unitary construction with the body.

DETAILED DESCRIPTION

Before describing in detail exemplary embodiments that are in accordance with the disclosure, it is noted that components have been represented where appropriate by convention symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
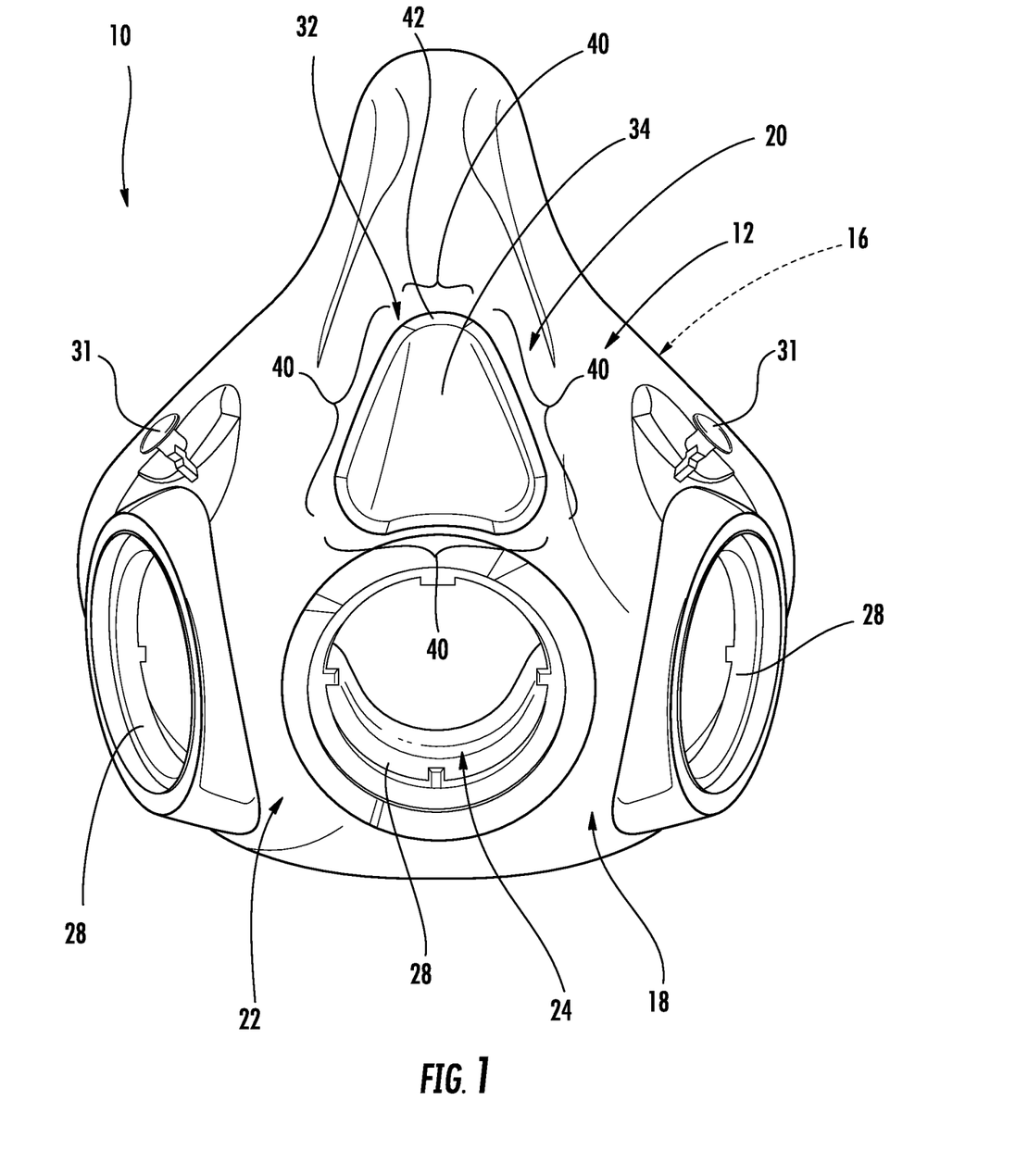
FIG. 1 is a front view of a first embodiment of a respirator mask for providing respiratory protection.

Referring now to the drawing figures in which like reference designations refer to like elements, an embodiment of a respirator mask for providing respiratory protection while also allowing for the transmission of voice constructed in accordance with the principles of the invention is shown in the figures and is generally designated as "10." FIG. 1 is a front view of an embodiment of the respirator mask 10, which is configured to be worn by a user in environments where the user is exposed to hazardous materials, such as, but not limited to, gases, vapors, aerosols (for example, dusts, mists, and/or biological agents), and/or the like. The mask 10 includes a body 12 that is sized and configured to cover the nose and mouth of the user. As shown herein, the mask 10 does not cover the user's eyes. Accordingly, the illustrated embodiment of the mask described herein is an oronasal half mask 10. However, it will be understood that the mask 10 is not limited to the body 12 shown in the figures. Rather, the mask 10 may be any other type of respiratory mask, such as, but not limited to, a full face respiratory mask and/or the like. In some embodiments, the mask 10 is a disposable respirator mask.

The body 12 of the mask 10 includes an interior surface 16 and an exterior surface 18 opposite the interior surface 16. The body 12 includes a nose area 20 (sometimes referred to as an "upper portion" of the mask body 12) and a mouth area 22 (sometimes referred to as a "lower portion" of the mask body 12). The nose area 20 is sized and configured to receive the nose of the user therein such that the nose area 20 covers at least a portion of the user's nose. For example, the nose area 20 covers the nose and portions of the upper cheeks of the user. Similarly, the mouth area 22 of the mask 10 is sized and configured to cover the user's mouth. For example, the mouth area 22 covers the mouth, at least a portion of the chin, and portions of the lower cheeks of the user.

Figure 2:
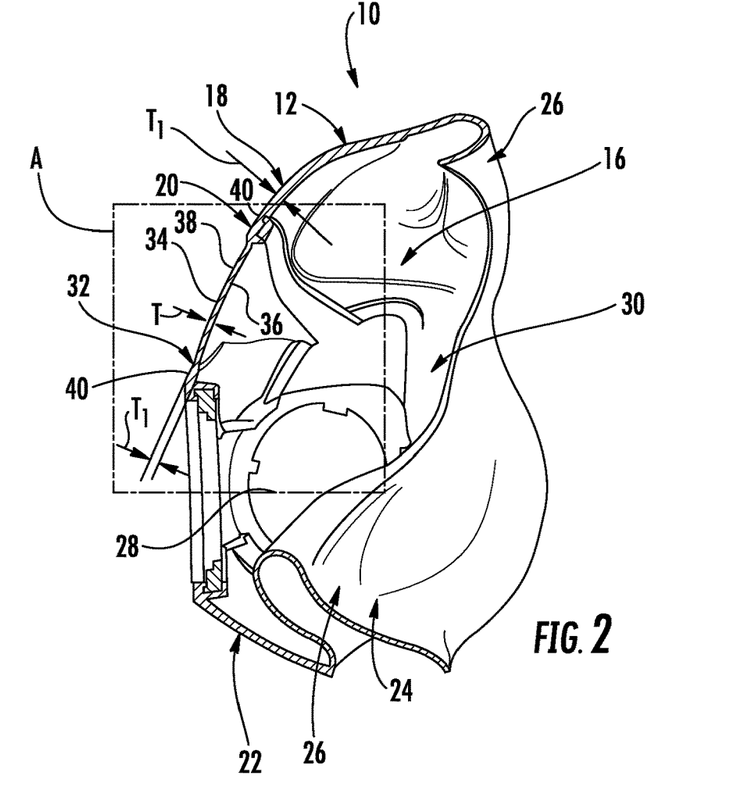
FIG. 2 is a perspective view illustrating a cross section of the respirator mask shown in FIG. 1.

The body 12 of the mask 10 includes a sealing area 24 that is configured to seal against the user's face to thereby seal the mask 10 to the user's face. As a non-limiting example, the sealing area 24 of the body 12 is defined by one or more flexible lips 26 (as shown in FIG. 2). However, it will be understood that the sealing area 24 additionally or alternatively may include any other structure, such as, but not limited to, a gasket, a cushion, and/or the like. In the sealing area 24 shown in FIG. 2, the one or more lips 26 are integrally formed with a single, unitary construction with the remainder of the body 12. However, the lip(s) 26 and/or other structure of the sealing area 24 may be a discrete component that is attached, either removably or fixedly, to the mask body 12. Optionally, the sealing area 24 is defined by a portion of a filtering structure (not shown) of the mask body 12, as is common in many disposable respirator masks wherein the body of the mask is fabricated from a filter material. In some embodiments, the structure of the sealing area 24 includes a reusable discrete molded member that is attached to the mask body 12 (not shown).

In the embodiment shown in FIG. 1, the body 12 of the mask 10 includes one or more openings 28. Each opening 28 is configured to receive one or more an attachable components (not shown), such as a replaceable filter cartridge, a valve, a breathing gas hose, and/or a speech module. The body 12 may include any number of the openings 28 depending on the particular application of the mask 10 and the number of attachable components that are used.

As shown in FIG. 2, the interior surface 16 of the body 12 has a concave shape such that the interior surface 16 defines an interior space 30 of the body 12 that is sized and configured to receive therein at least a portion of a user's face, such as the user's nose and mouth. While the mask 10 is worn by the user, the user's nose and mouth are received into the interior space 30 such that a plenum is defined between the interior surface 16 of the body 12 and the portion of the user's face received by the mask 10. So, the interior space 30 may be referred to herein as the plenum when the user is wearing the mask 10. During operation of the mask 10, the plenum holds breathable gas, such as atmospheric air and/or containerized air, that has been, for example, filtered by the mask 10 (such as by using one or more filter cartridges, using the body 12 of the mask 10, and/or the like) and/or supplied by a hose connected to the mask 10 (not shown).

Although not shown, the mask 10 optionally includes a harness that is configured to hold the mask body 12 on the user's face and thereby hold the mask 10 in position over the user's nose and mouth. In some embodiments, the harness includes a plurality of straps (not shown) that are attached to the mask body 12 and are configured to secure the mask 10 to the user's head. For example, the mask body 12 may include one or more attachment elements 31 to which the harness may be coupled. However, it will be understood that the harness additionally or alternatively may include any other structure. The harness may be reusable. Optionally, the harness is disposable. The harness is optionally composed of materials that are relatively easy to sterilize with relatively common sterilization methods.

The mask body 12 may be composed of any suitable material(s). For example, the mask body 12 may be composed of one or more materials that provide the body 12 with at least some flexibility. Examples of suitable materials, but are not limited to, thermosets, thermoplastics, elastomers, thermoplastic elastomers, filtering structures and/or filter materials, cushioning and/or dampening materials, shape memory materials, and/or the like. In some embodiments, some or an approximate entirety of the mask body 12 is fabricated from one or more filter materials such that at least a portion of the body 12 has a filtering structure.

Figure 3:
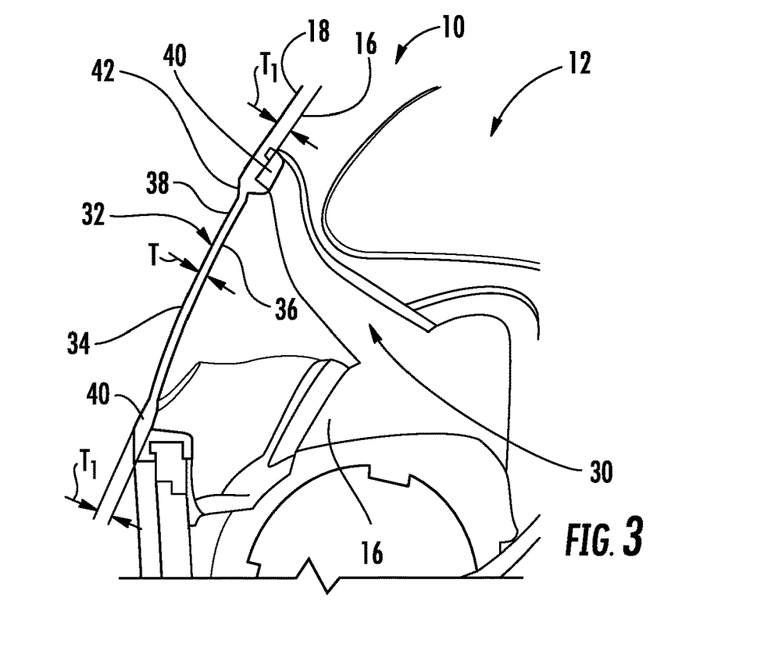
FIG. 3 is an enlarged cross section view of the bounded portion A of the respirator mask shown in FIG. 2.

Referring now to FIGS. 1-3, a first embodiment of a respirator mask having a voice transmittal feature is shown. As will be described in more detail below, the voice transmittal feature 32 is configured to passively enhance the intelligibility of the speech of a user wearing the mask 10. In other words, the voice transmittal feature 32 is configured to increase the ability of a listener to understand the speech of a user wearing the mask 10. The passive voice transmittal feature 32 thereby enhances communication between a user wearing the mask 10 and a listener.

As shown in FIGS. 1-3, the passive voice transmittal feature 32 includes a voice transmittal membrane 34 that is configured to vibrate in response to sound waves generated by the user wearing the mask 10. The vibration of the voice transmittal membrane 34 transmits the sound waves from the mask interior space 30, that is, from the plenum defined between the user's face and the interior surface 16, to outside the mask body 12, that is, to the ambient or external environment of the user wearing the mask 10.

Specifically, as the user speaks while wearing the mask 10, the sound waves generated by the user's speech within the plenum of the mask body 12 impact the voice transmittal membrane 34 along the interior surface 16 of the mask body 12 and, in particular, the interior surface 36 of the voice transmittal membrane 34. The impact of the sound waves with the voice transmittal membrane 34 vibrates the voice transmittal membrane 34 such that the sound waves are reproduced by the vibrating membrane 34 along the exterior surface 18 of the mask body 12 and, in particular, the exterior surface 38 of the voice transmittal membrane 34. FIG. 3 shows an enlarged view of the bounded portion A of FIG. 2. As shown in FIGS. 2 and 3, the interior surface 36 of the voice transmittal membrane 34 is continuous (i.e., contiguous) with the interior surface 36 of the mask body 12 and the exterior surface 38 is continuous (i.e., contiguous) with the exterior surface 18 of the mask body 12, even though thicknesses T and $T_1$ are different. The voice transmittal membrane 34 thereby passively transmits a user's speech from inside the plenum of the mask body 12 to the ambient environment of the user wearing the mask 10.

The voice transmittal membrane 34 may be thinner than one or more other segments of the mask body 12 that are adjacent or proximal to the voice transmittal membrane 34. As a non-limiting example, the one or more segments 40 may be immediately adjacent to the voice transmittal membrane 34. Further, the voice transmittal membrane 34 is thinner as compared to the segments 40 of the mask body 12 that surround the voice transmittal membrane 34. Specifically, as shown in FIG. 1, the surrounding segments 40 border the voice transmittal membrane 34 along substantially the entirety of the perimeter of the voice transmittal membrane 34. Put another way, the voice transmittal membrane 34 has a thickness T that is less than a thickness $T_1$ of the surrounding segments 40 of the mask body 12, as is shown in FIGS. 2 and 3. Additionally, the body 12 may include a transition area between the membrane 34 and the segments 40, in which the thickness of the body 12 increases from the thickness T of the voice transmittal membrane 34 and the thickness $T_1$ of the segments 40.

The thicker surrounding segments 40 add strength and structural integrity to the mask body 12. Moreover, the rigidity provided by the thicker surrounding segments 40 may enable and/or facilitate transmission of speech from the plenum of the mask body 12 through the voice transmittal membrane 34. For example, the rigidity provided by the thicker surrounding segments 40 may enable and/or facilitate vibration of the voice transmittal membrane 34 in response to sound waves generated by the user wearing the mask 10.

The voice transmittal membrane 34 may have any thickness T and may have a uniform thickness T or a non-uniform thickness. The surrounding segments 40 may have any thickness $T_1$, provided that thickness $T_1$ is greater than thickness T. In the illustrated embodiment, substantially the entirety of the perimeter of the voice transmittal membrane 34 is surrounded by surrounding segments 40 that are thicker than the voice transmittal membrane 34. However, it will be understood that any amount of the perimeter of the voice transmittal membrane 34 (for example, any number of the segments 40 or any length thereof) may be surrounded by thicker segments of the mask body 12. Put another way, at least a portion of the surrounding segments 40 may have a thickness T1 that is greater than a thickness T of at least a portion of the voice transmittal membrane 34. In some embodiments, the voice transmittal membrane 34 is thinner than a majority and/or a remainder of the mask body 12. Accordingly, the voice transmittal membrane 34 is more flexible than the mask body 12, even if the voice transmittal membrane 34 and the mask body 12 are composed of the same material.

In the illustrated embodiment, the passive voice transmittal feature 32 is located along the nose area 20 of the mask body 12, as is shown in FIGS. 1-3. Specifically, the voice transmittal membrane 34 extends along the nose area 20 of the body 12. However, the passive voice transmittal feature 32 is not limited to this location. For example, the passive voice transmittal feature 32 additionally or alternatively may be located at any other location along the mask body 12, such as, but not limited to, the mouth area 22.

The voice transmittal membrane 34 may be composed of any suitable material(s) that enable the voice transmittal membrane 34 to function as described and/or illustrated herein. Examples of suitable materials include, but are not limited to, thermosets, thermoplastics, elastomers, thermoplastic elastomers, filtering structures and/or filter materials, cushioning and/or dampening materials, shape memory materials, and/or the like. In the illustrated embodiment, the voice transmittal membrane 34 is composed of substantially the same material(s) as the mask body 12. However, it will be understood that in other embodiments the voice transmittal membrane 34 may be composed of one or more materials that are different than the material(s) from which the mask body 12 is composed. In some embodiments, the voice transmittal membrane 34 is fabricated from one or more filter materials (such as in embodiments wherein the mask body 12 is fabricated from a filter material).

The various design parameters of the mask 10, such as, but not limited to, the material(s) of the mask body 12, the material(s) of the voice transmittal membrane 34, the thickness T, the thickness(es) $T_1$, the thickness T of the voice transmittal membrane 34 relative to the value of the thickness $T_1$ of each surrounding segment 40, the number of surrounding segments 40 that are provided as thicker than the voice transmittal membrane 34, the amount of the perimeter of the voice transmittal membrane 34 that is surrounded by thicker segments of the body 12, the geometry of the voice transmittal membrane 34, the dimensions of the voice transmittal membrane 34, the location of the voice transmittal membrane 34, the orientation of the voice transmittal membrane 34, and/or the like, may be selected to enable the voice transmittal membrane 34 to function as described and/or illustrated herein, that is, to transmit a user's speech from inside the plenum of the mask body 12 to the ambient environment of the user wearing the mask 10 with less distortion such that a listener can better understand the speech of a user wearing the mask 10.

The passive voice transmittal feature 32 may transmit a user's speech from inside the plenum of the mask body 12 to the ambient environment of the user wearing the mask 10 with less distortion than known respirator masks 10. The passive voice transmittal feature 32 thus is configured to increase the ability of a listener to understand the speech of a user wearing the mask 10 and thereby enhance communication between the user and a listener.

Further, it should be understood that in the illustrated embodiment, the voice transmittal membrane 34 is a passive device and therefore the amplitude of the user's speech is not enhanced or increased by the passive voice transmittal feature 32. In other embodiments, the voice transmittal feature 32 is an active voice transmittal feature 32 that includes an active audio capture and/or transmission device that includes or is connected to a power source to increase the amplitude of the user's speech. In other words, as a non-limiting example, the mask 10 is not precluded from also including a microphone or other amplifier.

The voice transmittal membrane 34 shown in FIGS. 1-3 is integrally formed with a single, unitary construction with the mask body 12, regardless of whether the voice transmittal membrane 34 is composed of the same material(s) as the mask body 12. The single, unitary construction of the voice transmittal membrane 34 with the mask body 12 may allow the passive voice transmittal feature 32 and/or the mask 10 to be less expensive, less prone to failure, and/or the like than respirator masks that include discrete mechanical voice-transmission devices that are mounted or to the mask.

Figure 4:
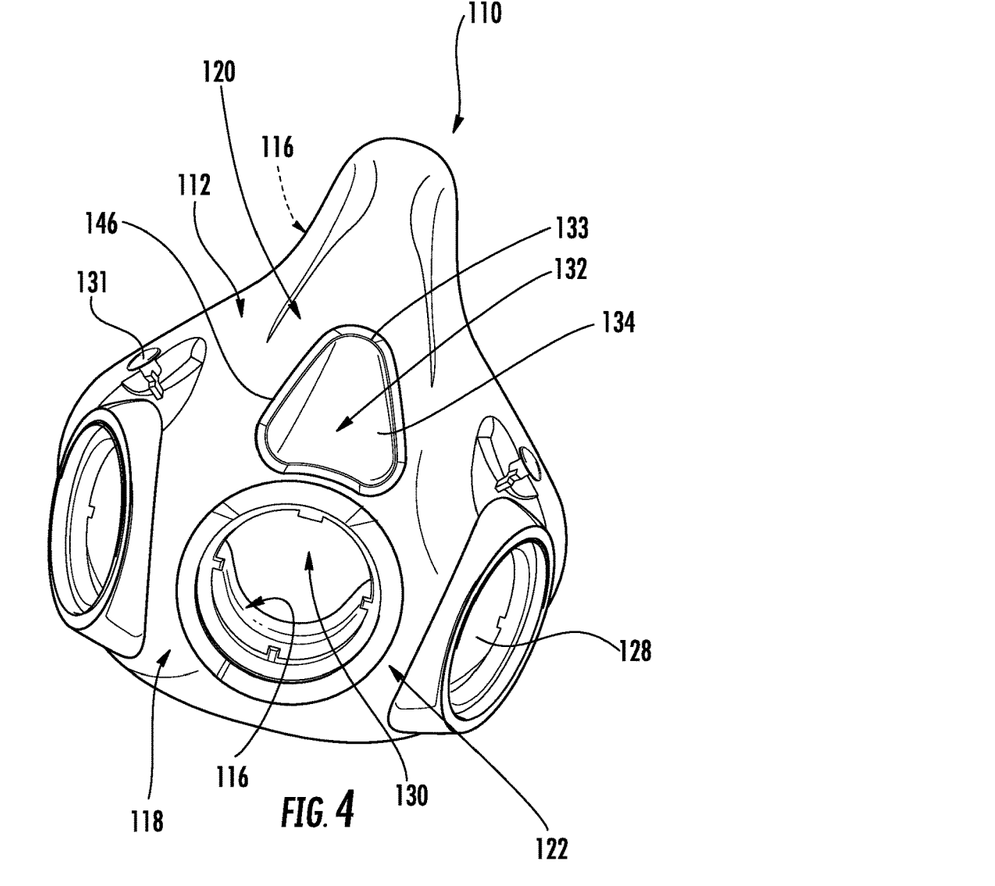
FIG. 4 is a front view of a second embodiment of a respirator mask.

However, in other embodiments, the voice transmittal membrane 34 may be a discrete component that is attached to the mask body 12. For example, FIG. 4 is a front view of a second embodiment of a respirator mask 110. In general, the components disclosed in the embodiment shown in FIGS. 1-3 are at least substantially the same as the corresponding components shown in FIGS. 4-7 that are designated with the same numbers in the one hundred series. For example, the mask body 12 shown in FIGS. 1-3 is at least substantially the same as the mask body 112 shown in FIGS. 4-7, except for any distinguishing features disclosed herein (such as an opening in the mask body to receive a removably attached voice transmittal element, as described in more detail below). Further, it will be understood that features disclosed for one embodiment are not precluded from being included in the other embodiment.

The mask body 112 includes an interior surface 116 and an exterior surface 118 opposite the interior surface 116. The body 112 includes a nose area 120 (sometimes referred to as an "upper portion" of the mask body 112) and a mouth area 122 (sometimes referred to as a "lower portion" of the mask body 12). The nose area 120 is sized and configured to receive the nose of the user therein such that the nose area 120 covers at least a portion of the user's nose. For example, the nose area 120 covers the nose and portions of the upper cheeks of the user. Similarly, the mouth area 122 of the mask 110 is sized and configured to cover the user's mouth. For example, the mouth area 122 covers the mouth, at least a portion of the chin, and portions of the lower cheeks of the user.

Although not shown in FIG. 4, the mask body includes a sealing area that is similar to the sealing area 24 of the embodiment shown in FIGS. 1-3 in that it is configured to seal against the user's face to thereby seal the mask 110 to the user's face.

In the embodiment shown in FIG. 4, the body 112 of the mask 110 includes one or more openings 128. Each opening 128 is configured to receive one or more an attachable components (not shown), such as a replaceable filter cartridge, a valve, a breathing gas hose, and/or a speech module. The body 112 may include any number of the openings 128 depending on the particular application of the mask 10 and the number of attachable components that are used.

The interior surface 116 of the mask body 112 has a concave shape such that the interior surface 116 defines an interior space 130 of the body 112 that is sized and configured to receive therein at least a portion of the user's face, such as the user's nose and mouth. While the mask 110 is worn by the user, the user's nose and mouth are received into the interior space 130 such that a plenum is defined between the interior surface 116 of the body 112 and the portion of the user's face received by the mask 10. So, the interior space 130 may be referred to herein as the plenum when the user is wearing the mask 110.

Although not shown, the mask 110 optionally includes a harness that is configured to hold the mask body 12 on the user's face and thereby hold the mask 10 in position over the user's nose and mouth. In some embodiments, the harness includes a plurality of straps (not shown) that are attached to the mask body 112 and are configured to secure the mask 110 to the user's head. For example, the mask body 01 112 may include one or more attachment elements 131 to which the harness may be coupled. However, it will be understood that the harness additionally or alternatively may include any other structure. The harness may be reusable. Optionally, the harness is disposable. The harness is optionally composed of materials that are relatively easy to sterilize with relatively common sterilization methods.

The mask body 112 may be composed of any suitable material(s). For example, the mask body 112 may be composed of one or more materials that provide the body 12 with at least some flexibility. Examples of suitable materials, but are not limited to, thermosets, thermoplastics, elastomers, thermoplastic elastomers, filtering structures and/or filter materials, cushioning and/or dampening materials, shape memory materials, and/or the like. In some embodiments, some or an approximate entirety of the mask body 112 is fabricated from one or more filter materials such that at least a portion of the body 112 has a filtering structure.

Figure 5:
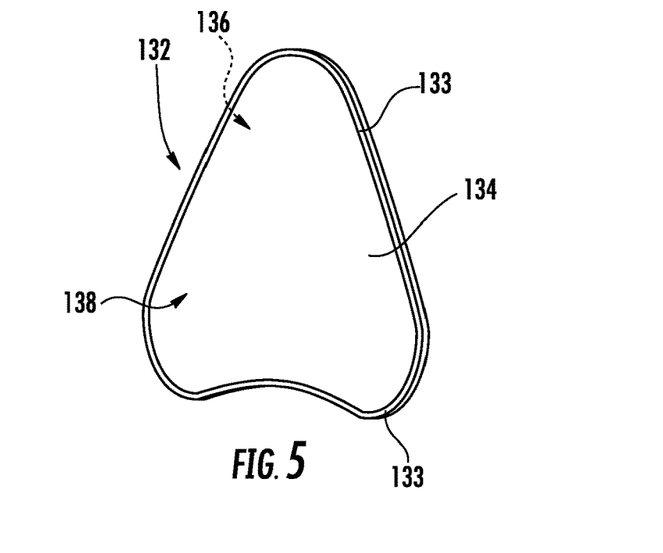
FIG. 5 is a perspective view of an embodiment of a voice transmittal feature of the respirator mask shown in FIG. 4.

The respiratory mask 110 includes a passive voice transmittal feature 132 that is configured to enhance the intelligibility of the speech of a user wearing the mask 110. In other words, like the passive voice transmittal feature 32 of the embodiment shown in FIGS. 1-3, the passive voice transmittal feature 132 of the embodiment shown in FIGS. 4 and 5 is configured to increase the ability of a listener to understand the speech of a user wearing the mask 110. The passive voice transmittal feature 132 thereby enhances communication between a user wearing the mask 110 and a listener.

Unlike the passive voice transmittal feature 132 of the embodiment shown in FIGS. 1-3, the passive voice transmittal feature 132 shown in FIGS. 4 and 5 is not integrally formed with a single, unitary construction with the mask body 112, and instead includes a frame 133 and a voice transmittal membrane 134. The voice transmittal membrane 134 is configured to vibrate in response to sound waves generated by the user wearing the mask 110. The vibration of the voice transmittal membrane 134 transmits the sound waves from the mask interior space 130, that is, from the plenum defined between the user's face and the interior surface 116, to outside the mask body 112, that is, to the ambient or external environment of the user wearing the mask 110.

Specifically, as the user speaks while wearing the mask 110, the sound waves generated by the user's speech within the plenum of the mask body 112 impact the voice transmittal membrane 134 along the interior surface 116 of the mask body 112 and, in particular, the interior surface 136 of the voice transmittal membrane 134. The impact of the sound waves with the voice transmittal membrane 134 vibrates the voice transmittal membrane 134 such that the sound waves are reproduced by the vibrating membrane 134 along an exterior surface 118 of the mask body 112 and, in particular, the exterior surface 138 of the voice transmittal membrane 134. The interior surface 136 of the passive voice transmittal membrane 134 and the frame 133 are continuous (i.e., contiguous) with the interior surface 136 of the mask body 112 and the exterior surface 138 and the frame 133 are continuous (i.e., contiguous) with the exterior surface 118 of the mask body 112, even though the thicknesses of the voice transmittal membrane 134, frame 133, and mask body 112 are different. The voice transmittal membrane 134 thereby transmits a user's speech from inside the plenum of the mask body 112 to the ambient environment of the user wearing the mask 110.

Referring now to FIGS. 4 and 5, as described above, the passive voice transmittal feature 132 includes the voice transmittal membrane 134 and a frame 133. In the illustrated embodiment, the frame 133 is coupled to the mask body 112, either removably or fixedly, such that the frame 133 is secured by the mask body 112, while the voice transmittal membrane 134 is coupled to and secured by the frame 133, as is shown in FIGS. 4 and 5. For example, the frame 133 may be clamped or crimped around the outer edges of the voice transmittal membrane 134 to secure the membrane 134. In other embodiments, the frame 133 is integrally formed with a single, unitary construction with the mask body 112 and the voice transmittal membrane 134 is removably or fixedly coupled to the frame 133. Moreover, in other embodiments, the voice transmittal membrane 134 is integrally formed with a single, unitary construction with the frame 133.

Figure 6:
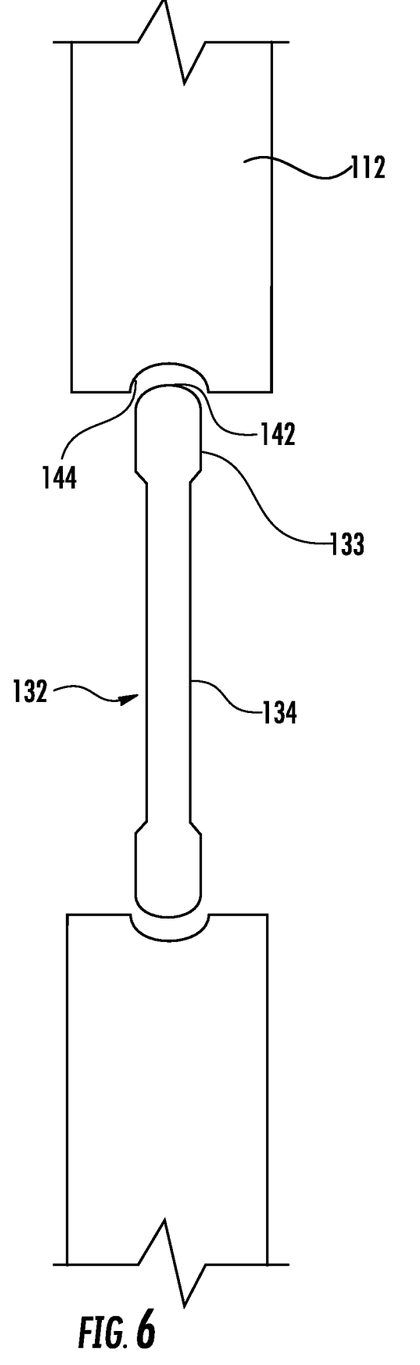
FIG. 6 is a cross section view of a first exemplary embodiment of an engagement between a voice transmittal element and the mask body.
Figure 7:
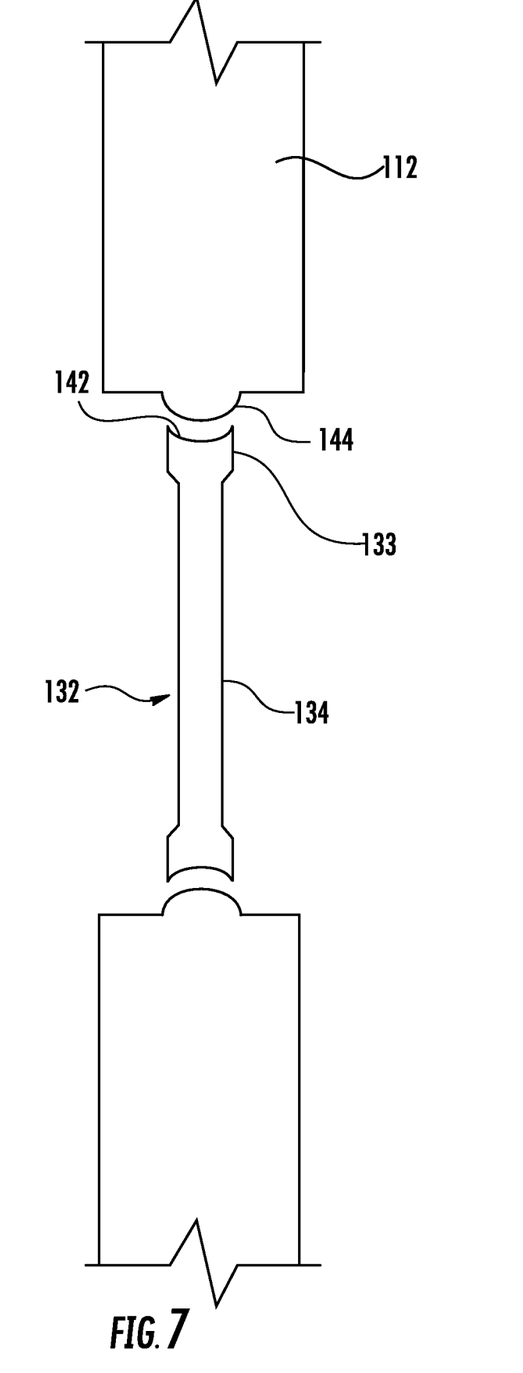
FIG. 7 is a cross section view of a second exemplary embodiment of an engagement between a voice transmittal element and the mask body.

As a non-limiting example, in an embodiment in which the frame 133 is removably coupled to the mask body 112, the frame 133 includes a perimeter 142 that extends around the outer edge of the frame 133. In one embodiment, the perimeter 142 has a convex shape in cross section. Further, the portion of the mask body 112 that engages with the frame 133 may have a perimeter 144 having a corresponding concave shape in cross section. For example, the mask body 112 includes an opening 146 that is sized and configured to accept the frame 133 and retain the frame 133 within the mask body 112. In this way, the convex perimeter 142 of the frame 133 may be snapped into or otherwise coupled to the concave perimeter 144 of the opening 146 in the mask body 112. Further, when the frame 133 is coupled to the mask body 112, the coupling may fluid tight so a gas within the plenum of the mask does not escape through the opening 146 when the user is wearing the mask 110. In an alternate non-limiting example, the frame perimeter 142 may have a concave shape in cross section and the perimeter 144 of the opening 146 may have a corresponding convex shape in cross section that, when the frame 133 is in the opening 146, is capable of retaining the frame within the mask body 112.

The rigidity of the frame 133 and/or the thickness of the mask body 112 relative to the voice transmittal membrane 134 may enable and/or facilitate operation of the voice transmittal membrane 134 to transmit speech from the plenum of the mask body 112 to the ambient or external environment. For example, the rigidity of the frame 133 and/or the thickness of the mask body 112 relative to the voice transmittal membrane 134 may enable and/or facilitate vibration of the voice transmittal membrane 134 in response to sound waves generated by the user wearing the mask 110.

In the illustrated embodiment, the passive voice transmittal feature 132 is located along a nose area 120 of the mask body 112, as is shown in FIG. 4. However, the passive voice transmittal feature 132 is not limited to this location. For example, the passive voice transmittal feature 132 additionally or alternatively may be located at any other location along the mask body 112, such as, but not limited to, a mouth area 122.

The voice transmittal membrane 134 and the frame 133 may each be composed of any suitable material(s) that enable the voice transmittal membrane 34 to function as described and/or illustrated herein. Examples of suitable materials include, but are not limited to, thermosets, thermoplastics, elastomers, thermoplastic elastomers, filtering structures and/or filter materials, cushioning and/or dampening materials, shape memory materials, and/or the like. As a non-limiting example, the voice transmittal membrane 134 is composed of substantially the same material(s) as the mask body 112, whereas the frame 133 is composed of a different, more rigid material. For example, the mask body 112 and the voice transmittal membrane 134 may each be composed of a first material having a first durometer and the frame may be composed of a second material having a second durometer that is greater than the first durometer. Alternatively, the voice transmittal membrane 134 may be composed of a material that is different than the material from which the mask body 112 is composed, provided that the voice transmittal membrane 134 is composed of a material having a durometer that is less than that of the material from which the frame 133 is composed.

The various design parameters of the mask 110, such as, but not limited to, the material(s) of the mask body 112, the rigidity of the frame 133, the material(s) of the voice transmittal membrane 134 and/or the frame 133, the thickness of the voice transmittal membrane 134, the thickness(es) of the mask body 112, the thickness of the voice transmittal membrane 134 relative to the thickness(es) of the mask body 112, the geometry of the voice transmittal membrane 134, the dimensions of the voice transmittal membrane 134, the location of the voice transmittal membrane 134, the orientation of the voice transmittal membrane 134, and/or the like, may be selected to enable the voice transmittal membrane 134 to function as described and/or illustrated herein, that is, to transmit a user's speech from inside the plenum of the mask body 112 to the ambient environment of the user wearing the mask 110 with less distortion such that a listener can better understand the speech of a user wearing the mask 110.

The voice passive transmittal feature 132 may transmit a user's speech from inside the plenum of the mask body 112 to the ambient environment of the user wearing the mask 110 with less distortion than known respirator masks 110. The passive voice transmittal feature 132 thus is configured to increase the ability of a listener to understand the speech of a user wearing the mask 110 and thereby enhance communication between the user and a listener.

Further, it should be understood that in the illustrated embodiment, the voice transmittal membrane 134 is a passive device and therefore the amplitude of the user's speech is not enhanced or increased by the passive voice transmittal feature 132. In other embodiments, the passive voice transmittal feature 132 may include an active device that includes or is connected to a power source to increase the amplitude of the user's speech. As a non-limiting example, the mask 110 may also include a microphone or other amplifier.

In some embodiments, a respirator mask that includes a passive voice transmittal feature is provided. The respirator mask provides respiratory protection while also allowing for the transmission of intelligible speech from a user. In one embodiment, the respiratory mask includes a body (12)(112) defining an interior space (30)(130) of the mask (10)(110) and including a first surface (16)(116) and a second surface (18)(118) opposite the first surface (16)(116), the first surface (16)(116) defining the interior space (30)(130), and a passive voice transmittal feature (32)(132) contiguous with the body (12)(112).

In one aspect of the embodiment, the passive voice transmittal feature (32)(132) is a membrane (34)(134), the membrane (34)(134) having a first surface (36)(136), a second surface (38)(138), and a first thickness (T) extending between the membrane first surface (36)(136) and the membrane second surface (38)(138), the body (12)(112) having a second thickness ($T_1$) at at least one location proximate the membrane (34)(134), the second thickness ($T_1$) extending between the body first surface (16)(116) and the body second surface (18)(118), the first thickness (T) being less than the second thickness ($T_1$).

In one aspect of the embodiment, the membrane first surface (36)(136) is contiguous with the body first surface (16)(116) and the membrane second surface (38)(138) is contiguous with the body second surface (18)(118).

In one aspect of the embodiment, the membrane (34)(134) has a perimeter, the body (12)(112) further including at least one portion (40) that is adjacent at least a portion of the membrane perimeter, the at least one portion of the body (12)(112) having the second thickness ($T_1$).

In one aspect of the embodiment, the passive voice transmittal feature (32) is integrally formed with a single, unitary construction with the body (12)(112).

In one aspect of the embodiment, the body (12)(112) further includes an upper segment (20)(120) and a lower segment (22)(122), the lower segment (22)(122) including the passive voice transmittal feature (32)(132). In one aspect of the embodiment, the upper segment (20)(120) is configured to receive a nose of a user and the lower segment (22)(122) is configured to receive a mouth of the user. In another aspect of the embodiment, the upper segment (20)(120) is configured to receive a nose of a user and the lower segment (22)(122) is configured to receive a mouth of the user.

In one aspect of the embodiment, the passive voice transmittal feature (32)(132) is located proximate a user's mouth when the user is wearing the mask (10)(110).

In one aspect of the embodiment, the voice transmittal membrane (34)(134) is and the body (12)(112) are composed of substantially the same material.

In one aspect of the embodiment, the passive voice transmittal feature (132) includes a membrane (134) and a frame (133) coupled to the membrane (134), the frame (133) being coupled to the body (112).

In one aspect of the embodiment, frame (133) is removably coupled to the body (112). In one aspect of the embodiment, the body (112) further includes an opening (146) extending between the body first surface (116) and the body second surface (118), the opening (146) being configured to receive and retain the frame (133). In another aspect of the embodiment, wherein the frame (133) is fixedly coupled to the body (112).

In one aspect of the embodiment, the membrane (134) has a perimeter, the frame (133) being coupled to the perimeter of the membrane (134).

In one aspect of the embodiment, the passive voice transmittal feature (132) includes a membrane (134) and a frame (133) that is integrally formed with a single, unitary construction with the body (112), the frame (133) being coupled to the membrane perimeter.

In one embodiment, a respirator mask (110) includes: a body (112) defining an interior space (130) of the mask (110) and including an interior surface (116), an exterior surface (118) opposite the interior surface (116), and a first thickness (T) extending from the body interior surface (116) to the body exterior surface (118), the interior surface (116) defining the interior space (130); and a passive voice transmittal feature (132) in the body (112) that is contiguous with the body (112), the passive voice transmittal feature (132) being located proximate a user's mouth when the user is wearing the mask (110), the passive voice transmittal feature (132) including: a membrane (143) having a perimeter, an interior surface (136), an exterior surface (138), and a second thickness ($T_1$) extending from the membrane interior surface (136) to the membrane exterior surface (138), the first thickness (T) being greater than the second thickness ($T_1$); and a frame (133) bordering and being coupled to the membrane (134) perimeter, the frame (133) being coupled to the body (112).

In one aspect of the embodiment, the frame (133) is removably coupled to the body (112), the body (112) further including an opening (146) extending between the body interior surface (116) and the body exterior surface (118), the opening (124) being configured to receive and retain the frame (133).

In one embodiment, a respirator mask (110) includes a body (112) defining an interior space (130) of the mask (110) and including an interior surface (116), an exterior surface (118) opposite the interior surface (116), and a first thickness (T) extending from the body interior surface (116) to the body exterior surface (118), the interior surface (116) defining the interior space (130); and a passive voice transmittal feature (132) contiguous with the body (112) and including: a membrane (134) having a perimeter, an interior surface (136), an exterior surface (138), and a second thickness ($T_1$) extending from the membrane interior surface (136) to the membrane exterior surface (138), the first thickness (T) being greater than the second thickness ($T_1$); and a frame (133) bordering and being coupled to the membrane (134) perimeter, the frame (133) being formed with a single, unitary construction with the body (112).

Other embodiments may include:

Embodiment 1. A respiratory mask comprising:
a body configured to cover a nose and a mouth of a user, the body comprising an interior space that defines a plenum between the body and a face of the user when the user is wearing the mask; and
a voice transmittal feature comprising a voice transmittal membrane that is configured to vibrate in response to sound waves generated by the user such that the voice transmittal membrane transmits the sound waves from the plenum of the body to an ambient environment of the user.

Embodiment 2. The respiratory mask of Embodiment 1, wherein the voice transmittal membrane is thinner as compared to at least one segment of the body that is adjacent the voice transmittal membrane.

Embodiment 3. The respiratory mask of Embodiment 1, wherein the body comprises a surrounding segment that at least partially surrounds the voice transmittal membrane, the voice transmittal membrane having a thickness that is less than a thickness of the surrounding segment.

Embodiment 4. The respiratory mask of Embodiment 1, wherein the voice transmittal membrane is integrally formed with a single, unitary construction with the body.

Embodiment 5. The respiratory mask of Embodiment 1, wherein the voice transmittal membrane is integrally formed with a single, unitary construction with the body, the voice transmittal membrane being thinner than a remainder of the body.

Embodiment 6. The respiratory mask of Embodiment 1, wherein the voice transmittal membrane is fabricated from substantially the same materials as the body.

Embodiment 7. The respiratory mask of Embodiment 1, wherein the voice transmittal feature comprises a frame that is held by the body, the voice transmittal membrane of the voice transmittal feature being held by the frame.

Embodiment 8. The respiratory mask of Embodiment 1, wherein the voice transmittal feature comprises a frame that is integrally formed with a single, unitary construction with the body, the voice transmittal membrane of the voice transmittal feature being held by the frame.

Embodiment 9. The respiratory mask of Embodiment 1, wherein the body comprises a nose area configured to receive the nose of the user therein, the voice transmittal feature extending along the nose area of the body.

Embodiment 10. The respiratory mask of Embodiment 1, wherein the body comprises a mouth area configured to cover the user's mouth, the voice transmittal feature extending along the mouth area of the body.

Embodiment 11. The respiratory mask of Embodiment 1, wherein the body comprises a nose area configured to receive the nose of the user therein and a mouth area configured to cover the user's mouth, at least one of the nose area and the mouth area comprising the voice transmittal feature.

Embodiment 12. The respiratory mask of Embodiment 1, wherein the respiratory mask is a half mask.

Embodiment 13. The respiratory mask of Embodiment 1, further comprising a harness configured to hold the body on the user's face.

Embodiment 14. The respiratory mask of Embodiment 1, wherein the body comprises an opening configured to receive at least one of a filter cartridge, a valve, or a hose therein.

Embodiment 15. A respiratory mask comprising:
a body configured to cover a nose and a mouth of a user, the body comprising an interior space that defines a plenum between the body and a face of the user when the user is wearing the mask; and
a voice transmittal feature comprising a voice transmittal membrane that is thinner as compared to at least one segment of the body that borders the voice transmittal membrane, wherein the voice transmittal membrane is configured to vibrate in response to sound waves generated by the user such that the voice transmittal membrane transmits the sound waves from the plenum of the body to an ambient environment of the user.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the scope of the claims will be apparent to those of skill in the art upon reviewing the above description.

The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A respirator mask, comprising:
a body defining an interior space of the mask and including a first surface and a second surface opposite the first surface, the first surface defining the interior space; and
a passive voice transmittal feature contiguous with the body, the passive voice transmittal feature including a membrane and a frame, the membrane having an exterior surface, the membrane and the frame being integrally formed as a single unit with a single unitary construction, the frame being removably coupled to the body, the membrane and frame as the single unit being in direct contact with the body when the frame is coupled to the body, an entirety of the exterior surface of the membrane being uncovered.

2. The respirator mask of claim 1, wherein the membrane further has an interior surface, and a first thickness (T) extending between the membrane interior surface and the membrane exterior surface, the body having a second thickness ($T_1$) at at least one location proximate the membrane, the second thickness ($T_1$) extending between the body first surface and the body second surface, the first thickness (T) being less than the second thickness ($T_1$).

3. The respirator mask of claim 1, wherein the body further includes an upper segment and a lower segment, the lower segment including the passive voice transmittal feature.

4. The respirator mask of claim 3, wherein the upper segment is configured to receive a nose of a user and the lower segment is configured to receive a mouth of the user.

5. The respirator mask of claim 1, wherein the body further includes an upper segment and a lower segment, the upper segment including the passive voice transmittal feature.

6. The respirator mask of claim 5, wherein the upper segment is configured to receive a nose of a user and the lower segment is configured to receive a mouth of the user.

7. The respirator mask of claim 1, wherein the passive voice transmittal feature is located proximate a user's mouth when the user is wearing the mask.

8. The respirator mask of claim 1, wherein the membrane and the body are composed of substantially the same material.

9. The respirator mask of claim 1, wherein the membrane has a perimeter, the frame extending around the perimeter.

10. The respirator mask of claim 9, wherein the body defines an opening extending between the body first surface and the body second surface, the opening being configured to receive and retain the frame.

11. The respirator mask of claim 10, wherein a portion of the body defining the opening has a first cross-sectional shape and the frame has a second cross-sectional shape that is complementary to the first cross-sectional shape.

12. The respirator mask of claim 11, wherein the first cross-sectional shape is a concave shape and the second cross-sectional shape is a convex shape.

13. The respirator mask of claim 11, wherein the first cross-sectional shape is a convex shape and the second cross-sectional shape is a concave shape.

14. A respirator mask, comprising:
a body defining an interior space of the mask and including an interior surface, an exterior surface opposite the interior surface, an opening extending between the interior surface and the exterior surface, and a first thickness (T) extending from the body interior surface to the body exterior surface, the interior surface defining the interior space, and a portion of the body defining the opening having a first cross-sectional shape; and
a passive voice transmittal feature in the body that is contiguous with the body, the passive voice transmittal feature being located proximate a user's mouth when the user is wearing the mask, the passive voice transmittal feature including:
  a membrane having a perimeter, an interior surface, an exterior surface, and a second thickness ($T_1$) extending from the membrane interior surface to the membrane exterior surface, the first thickness (T) being greater than the second thickness ($T_1$), an entirety of the exterior surface of the membrane being uncovered; and
  a frame bordering and being coupled to the membrane perimeter, the frame being removably coupled to the body, the frame having a second cross-sectional shape that is complementary to the first cross-sectional shape such that the frame is configured to be snapped into the opening.

* * * * *